Patented Oct. 19, 1937

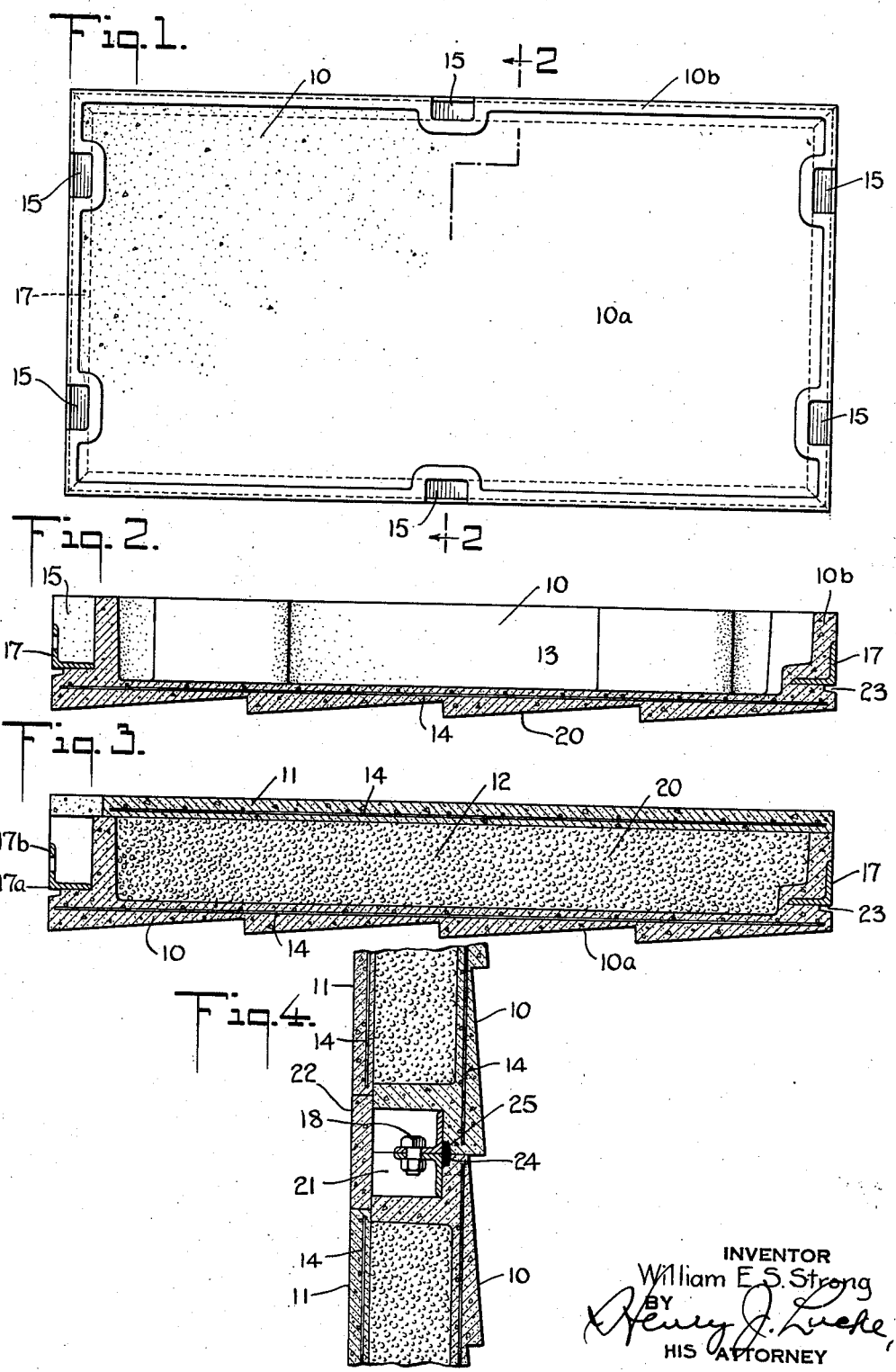

2,096,265

UNITED STATES PATENT OFFICE 2,096,265

STRUCTURAL UNIT AND ASSEMBLY OF SAME

William E. S. Strong, New York, N. Y., assignor to John B. Pierce Foundation, New York, N. Y., a corporation of New York Application June 17, 1936, Serial No. 85,624

16 Claims. (Cl. 72—36)

This invention relates to a structural unit and to an assembly of a plurality of same in a building construction.

More particularly the present invention relates to a preformed structural unit, and preferably a composite insulated unit of relatively light weight and high insulating characteristics, the unit per se desirably affording positive means for uniting same to like units in assembly, and/or to adjacent structure, in a building construction.

Pursuant to preferred forms of the invention, each unit is preshaped to preferably rectangular block formation to include mutually spaced marginal indentations defined in the lateral peripheral faces of the unit, and opening into one of the major faces thereof, such indentations affording opportunity for, when properly aligned in coordinating relation with similar indentations of contiguous faces of adjacent units or with other suitable means provided, joinder between such adjacent units and/or other adjacent structure of the building construction. Suitable means are incorporated in and/or with the individual units at the locations of indentation to afford positive securement of the assembled units and/or other adjacent structure.

Desirably, the unit is provided with two major faces mutually spaced and oppositely disposed and configurated, one to function as an exterior wall face for weathering, and the other as an interior, preferably finished, wall face. To attain continuity of exposed wall face in an assembly of the units, the recess defined by aligned coordinating indentations of adjacent units may be closed by suitable means.

The structural unit is advantageously composite in nature. Its component elements are preferably precast of a cementitious material, and are so configurated as to cooperate in defining a closed recess for the retention of insulating material. The insulating material may be loose and uncompacted in nature, and preferably comprises flocculent vermiculite mineral wool or the like. Accordingly, a structural unit is had combining the qualities of strength, lightness, resistance to weather, and high insulating value.

In the drawing illustrating a preferred embodiment of the invention:—

Fig. 1 is a top plan view of the component recessed element of a composite structural unit pursuant to the phase of this invention wherein positive means are provided to afford joinder in an assembly.

Fig. 2 represents a vertical section taken on the line 2—2, Fig. 1,

Fig. 3 is a view corresponding to Fig. 2, but illustrating the completely defined, enclosed recess of the composite unit inclusive of insulating material.

Fig. 4 illustrates a method of assembling respective composite structural units of Fig. 3 to one another in assembly of a building construction.

Referring to the drawing, a composite insulated structural unit pursuant to a preferred form of the present invention is illustrated in Fig. 3. The component elements of the unit are preferably pre-cast from a concretious material, and comprise a recessed element 10, see Figs. 1 and 2, and a closure element 11 for cooperating with the recessed element 10 in confining a quantity of insulating material 12 interiorly of the completely prepared unit.

The recessed element 10 is usually of a rectangular block formation including a rectangular slab portion 10a and lateral peripheral walls 10b extending from one face of same integrally therewith. The slab portion 10a and the lateral peripheral walls 10b serve to define a recess 13.

The slab portion 10a of the recessed element 10 may have its outer face configurated as at 10c for cooperation with like configurated slab faces of adjacent units in an assembly of such units, to provide continuity of exposed wall face in a building construction.

Where the component elements 10 and 11 of the unit are pre-cast from a concretious material, suitable reinforcement such as the coarse wire mesh 14 may be included as a structural base for the slab portions.

Ease of assembly and positiveness of securement of individual units to one another and/or to adjacent structure in a building construction is afforded by the provision of suitable means mutually spaced in the outside faces of the lateral peripheral walls 10b of the recessed element 10. Such means advantageously comprise mutually spaced outside-marginal indentations 15 defined by irregular formation of the walls 10b at the locations of indentations. The indentations 15 are of dimensions sufficient to provide space for manipulation of positive means employed to secure the unit to adjacent structure, and are open at the limit of extension of the lateral peripheral walls 10b to afford access thereinto.

Positive means for securing the unit to adjacent structure may be provided in part by incorporating therewith, and laterally of the recessed member 10 a reinforcing frame desirably of angle-iron, as indicated at 17, the frame being disposed near the location of intersection of the lateral peripheral walls 10b with the slab portion 10a, and having the vertex 17a of the angle-iron directed outwardly and toward the slab portion 10a. The upstanding leg member 17b of the angle-iron frame 17 therefore traverses the lower portion of the lateral openings of the marginal indentations 15, and provides means whereby the unit may be secured, as for instance by bolting, see 18 Fig. 4, to units disposed adjacent thereto and having marginal indentations aligned cooperatively with marginal indentations thereof, see Fig. 4, or to other structure in a building construction.

The closure element 11, as a component element of the structural unit, is preferably of slab formation dimensioned to coordinate with the recess element 10 in effecting closure of the recess therein. The outside face of the closure element 10 is preferably configurated to coordinate with like faces of adjacent structural units in effecting continuity of exposed wall face, preferably the interior wall face, of a building construction. The peripheral edges of the closure element 11 may be supplied with mutually spaced marginal indentations for coordination with the mutually spaced outside-marginal indentations of the recessed element 10 to provide continuation of such indentations to the exposed face of the closure element 11 i. e. to a major face of the completely prepared structural unit.

The recess 13 defined in the recessed element 10 is filled with any suitable type of insulating material 20. Loose insulation of the nature of flocculent vermiculite or mineral wool is preferable as an effective insulation against heat and cold and sound transmission, and may be readily used in its loose flocculent state because of its confinement within the body of the unit.

The closure element 11 preferably includes insulating properties in itself, and is secured in place over the insulation filled recess 13 in abutting relation to the end faces of the extremities of the lateral peripheral walls 10b by any suitable means. Preferably it is sealed and bonded in place.

The marginal indentations 15 communicate with a major face of the structural unit and afford access laterally of the unit to permit lateral joinder thereof with adjacent units of like nature in an assembly of same, and/or with other structure in the building construction. The respective marginal indentations 15 of adjacent, side-by-side aligned units are themselves aligned cooperatively, see Fig. 4, to provide recesses 21, open at a wall face of the assembled units to afford access thereinto. The upstanding leg member 17b of the respective angle-iron frames 17 are disposed proximate one another, and may be joined in any suitable positive manner, as for instance by the bolts 19.

To attain continuity of exposed wall face in an assembly of the units, joinder of the units to one another being affected as above described, the recesses defined by the aligned coordinating indentations of adjacent units may be closed by suitable means. As illustrated in Fig. 4, such means conveniently comprises an insert cover element 22 for removable placement in the recess openings defined by indented edges of respective slab elements 11, and for coordinated alignment with such slab elements 11.

Advantageously, means are provided in the individual units for effecting sealing of the joints between assembled units, such means preferably take the form of that disclosed in my copending application for U. S. Patent, filed December 12th, 1935, Serial No. 54,028, entitled Atmospheric protected flexible joint for building units.

Accordingly, grooves 23 together extending around the lateral peripheral faces of the unit and preferably at a location near the location of the intersection of the lateral peripheral sides with the slab portion 10a, are provided. As illustrated in Fig. 4, respective, opposingly contiguous grooves 23 of adjacent units in the assembly cooperate to form an enclosed longitudinal slot, indicated at 24. The slot 24 is filled with a plastic self-hardening material, and a rigid strip is inserted in the slot 24 displacing a volume of the plastic material equal to its own volume, such displaced plastic material being forced into the joinder crack between adjacent units.

This invention has been illustrated and described with particular reference to its embodiment in units of composite formation inclusive of insulating material. However, the features providing ease and positiveness of joinder between adjacent units in an assembly and/or adjacent units in a building construction may be incorporated in a solid block of unitary formation, or in units of other desired and suitable types of formation.

Whereas, I have described my invention by reference to specific forms thereof, it will be understood that many changes and modifications may be made without departing from the spirit of the invention, as set forth in the following claims.

I claim:

1. An insulated composite structural unit comprising a recessed element pre-formed to include a slab member and recess-defining walls extending integrally from one face of same and continuously peripherally thereof, insulating material filling the recess in the recessed element, and a slab element, independent of the said insulating material, secured to the recess-defining walls, closing the recess and confining the said insulating material therein.

2. An insulated composite structural unit comprising a recessed element pre-formed of concretious material to include a slab member and recess-defining walls extending integrally from one face of same and continuously peripherally thereof, loose insulating material of the nature of flocculent vermiculite filling the recess in the recessed element, and a slab element of insulating material secured to the recess-defining walls, closing the recess and confining the loose insulating material therein.

3. An insulated composite structural unit comprising a recessed element pre-formed to include a slab member having its outer face configurated for coordination with like configurated faces of similar units to provide an exterior weather resistant face for an assembly of such units, and recess-defining walls extending integrally from the opposite face of same and continuously peripherally thereof, insulating material filling the recess in the recessed element, and a slab element, independent of the said insulating material, secured to the recess-defining walls, closing the recess and confining the insulating material therein, said slab element having its outer face adapted to serve as a portion of the inner wall resulting from the assembly of a plurality of such units.

4. An insulated composite structural unit comprising a recessed element pre-formed to include a slab member and recess-defining walls extending integrally from one face of same and continuously peripherally thereof, insulating material filling the recess in the recessed element, and a slab element secured to the recess-defining walls, closing the recess and confining the insulating material therein, said recess defining walls including means mutually spaced apart around the recess-defining walls for securing the composite structural unit to adjacent structure in a building construction.

5. An insulated composite structural unit comprising a recessed element pre-formed to include a slab member and recess-defining walls extending integrally from one face of same and continuously peripherally thereof, insulating material filling the recess in the recessed element, and a slab element, independent of the said insulating material, secured to the recess-defining walls, closing the recess and confining the said insulating material therein, said recess defining walls including means mutually spaced apart around their periphery for securing the composite structural unit to adjacent structure in a building construction, and means extending lengthwise therewith for cooperation with like means provided in contiguous portions of adjacent structure in effecting a weather tight seal therebetween.

6. An insulated composite structural unit comprising a recessed element pre-formed to include a slab member and recess-defining walls extending integrally from one face of same and continuously peripherally thereof, insulating material filling the recess in the recessed element, and a slab element secured to the recess-defining walls, closing the recess and confining the insulating material therein, said recess defining walls including mutually spaced outside-marginal indentations, open at the limit of extension of said walls, and means associated therewith for securing the composite structural unit to adjacent structure in a building construction.

7. An insulated composite structural unit comprising a recessed element pre-formed to include a slab member and recess-defining walls extending integrally from one face of same and continuously peripherally thereof, insulating material filling the recess in the recessed element, and a slab element, secured to the recess-defining walls, closing the recess and confining the insulating material therein, said recess defining walls including a reinforcing frame, and means whereby said frame may be secured to adjacent structure in a building construction.

8. An insulated composite structural unit comprising a recessed element pre-formed to include a slab member and recess-defining walls extending integrally from one face of same and continuously peripherally thereof, insulating material filling the recess in the recessed element, and a slab element, secured to the recess-defining walls, closing the recess and confining the insulating material therein, said recess-defining walls including mutually spaced, outside-marginal indentations, and a reinforcing angle-iron frame near the location of intersection of the recess-defining walls with the slab member, said angle-iron frame being disposed with the vertex of the angle-iron directed outwardly and toward the slab member, and said indentations being open at the limit of outward extension of the recess-defining walls to permit fastening of the angle-iron frame and therewith the composite structural unit to adjacent structure in a building construction.

9. An insulated composite structural unit comprising a recessed element pre-formed to include a slab member and recess-defining walls extending integrally from one face of same and continuously peripherally thereof, insulating material filling the recess in the recessed element and a slab element, secured to the recess-defining walls, closing the recess and confining the insulating material therein, said recess-defining walls including mutually spaced outside-marginal indentations, and a reinforcing angle-iron frame near the location of intersection of the recess-defining walls with the slab member, said angle-iron frame being disposed with the vertex of the angle-iron directed outwardly and toward the slab member, and said indentations being open at the limit of outward extension of the recess-defining walls to permit fastening of the angle-iron frame and therewith the composite structural unit to adjacent structure in a building construction, and means running lengthwise of the joints between the said composite unit and adjacent structure providing for the weather sealing of such joints.

10. A structural unit comprising a block of building material preformed to include two mutually spaced, oppositely disposed major faces, and a plurality of marginal indentations defined and spaced apart mutually in the lateral peripheral faces of the block and opening into one of the said major faces thereof, said indentations being dimensioned to afford clearance for manually joining the block with adjacent blocks of similar configuration disposed in coordinating lateral relationship therewith, or with other structure in a building construction.

11. A structural unit comprising a block of building material preformed to include two mutually spaced, oppositely disposed major faces, and a plurality of marginal indentations defined and spaced apart mutually in the lateral peripheral faces of the block and opening into one of the said major faces thereof, said indentations being dimensioned to afford clearance for manually joining the block with adjacent blocks of similar configuration disposed in coordinating lateral relationship therewith, or with other structure in a building construction; and means incorporated in the block at the locations of indentations for facilitating the said joinder.

12. A structural unit comprising a block of building material preformed to include two mutually spaced, oppositely disposed major faces, and a plurality of marginal indentations defined and spaced apart mutually in the lateral peripheral faces of the block and opening into one of the said major faces thereof, said indentations being dimensioned to afford clearance for manually joining the block with adjacent blocks of similar configuration disposed in coordinating lateral relationship therewith, or with other structure in a building construction; and a reinforcing frame extending around the lateral peripheral faces of the block traversing at least a portion of the lateral openings of said marginal indentations in providing means for facilitating the said joinder.

13. A structural unit comprising a block of building material preformed to include two mutually spaced, oppositely disposed major faces, and mutually spaced marginal indentations defined in the lateral peripheral faces of the block and opening into one of the said major faces thereof, said indentations being dimensioned to permit lateral joinder with adjacent blocks of similar configuration disposed in coordinating lateral relationship therewith, or with other structure in a building construction; and a reinforcing angle-iron frame extending around the lateral peripheral faces of the block traversing at least a portion of the lateral openings of said marginal indentations to provide means for facilitating the said joinder, said angle-iron frame being disposed with the vertex of the angle-iron directed outwardly of the block and toward that major face thereof in which the marginal indentations open.

14. A structural unit comprising a block of building material preformed to include two mutually spaced, oppositely disposed major faces, and mutually spaced marginal indentations defined in the lateral peripheral faces of the block and opening into one of the said major faces thereof, said indentations being dimensioned to permit lateral joinder with adjacent blocks of similar configuration disposed in cordinating lateral relationship therewith, or with other structure in a building construction; means incorporated in the block at the locations of indentations for facilitating the said joinder; and means extending lengthwise with the lateral peripheral faces of the block for cooperation with like means provided in contiguous opposing portions of adjacent structure to effect a weather tight seal therebetween.

15. In a building construction, an assembly of structural units, each unit comprising a block of building material preformed to include two mutually spaced, oppositely disposed major faces, and mutually spaced marginal indentations defined in the lateral peripheral faces of the block and opening at one of the said major faces thereof, said indentations including means to afford, and being dimensioned to permit, joinder between adjacent blocks disposed with respective opposing marginal indentations of contiguous faces thereof in coordinating alignment; and means for closing the recesses formed by said coordinating aligned indentations after joinder between blocks has been effected.

16. In a building construction an assembly of insulated composite structural units, each unit comprising a recessed element preformed to include a slab member and recess-defining walls extending integrally from one face of same and continuously peripherally thereof, insulating material filling the recess in the recessed element, a slab element, secured to the recess-defining walls closing the recess and confining the insulating material therein, said recess-defining walls including mutually spaced outside marginal indentations open at the limit of extension of said walls, and said slab element including mutually spaced marginal indentations respectively coordinating with the respective outside-marginal indentations of the recess defining walls to form a continuation thereof to the outer surface of the slab element, said coordinating indentations including means to afford, and being dimensioned to permit, joinder between adjacent structural units disposed with respective opposing marginal indentations of contiguous faces thereof in coordinating alignment; and means for closing the recesses formed by said coordinating aligned indentations after joinder between structural units has been effected.

WILLIAM E. S. STRONG.